Oct. 25, 1938.   H. J. SHARP   2,134,008
FASTENING MECHANISM
Filed Dec. 16, 1936   2 Sheets-Sheet 1
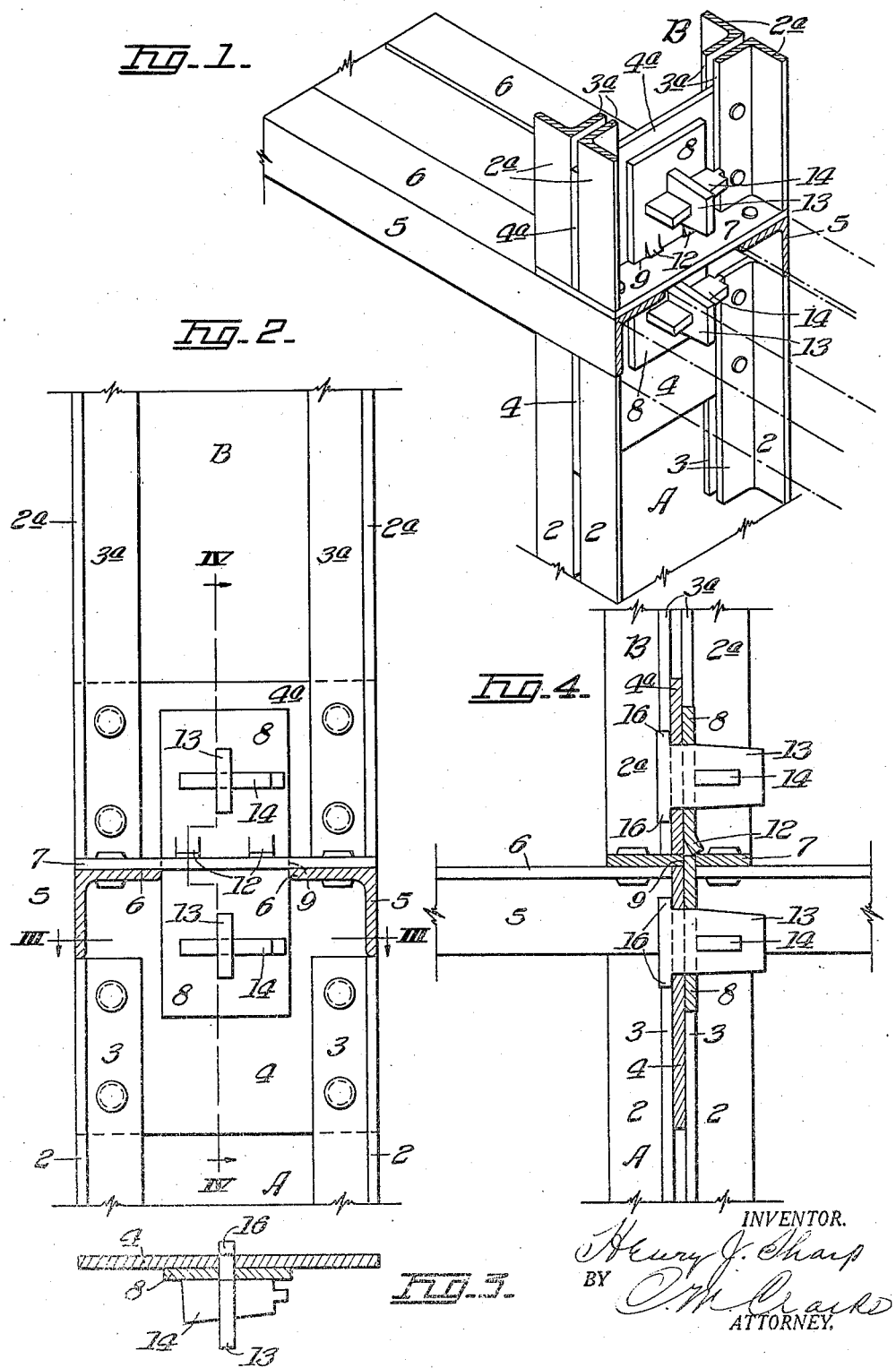
INVENTOR.
Henry J. Sharp
BY
ATTORNEY.

Oct. 25, 1938.    H. J. SHARP    2,134,008
FASTENING MECHANISM
Filed Dec. 16, 1936    2 Sheets-Sheet 2
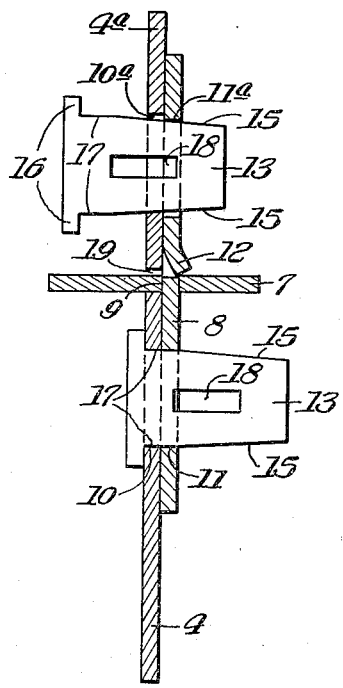
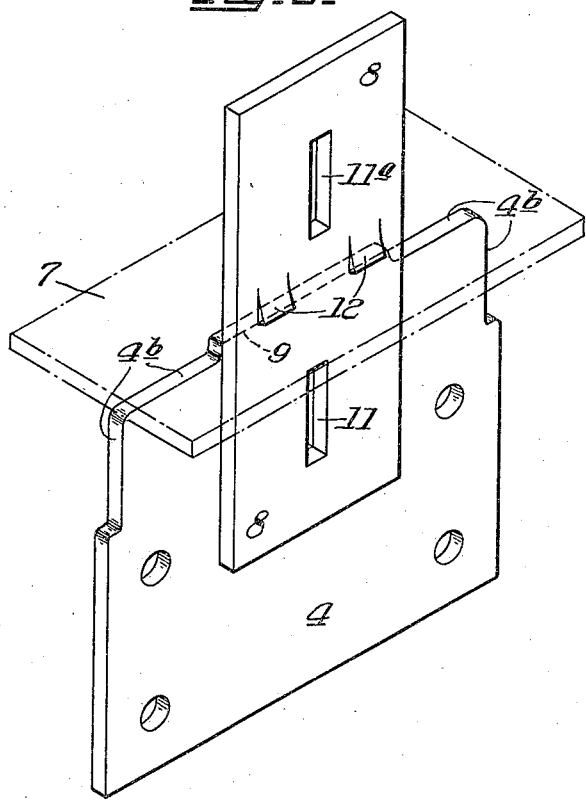
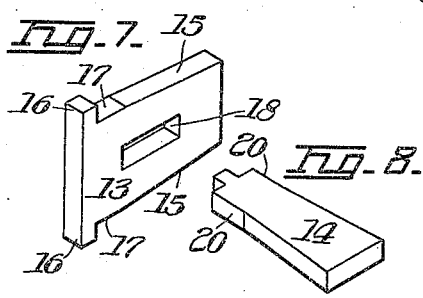
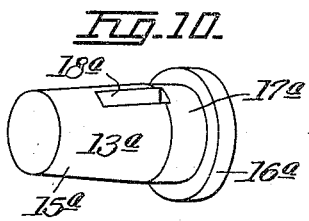
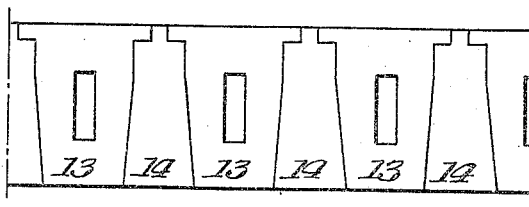
INVENTOR.
Henry J. Sharp
BY
ATTORNEY.

Patented Oct. 25, 1938

2,134,008

UNITED STATES PATENT OFFICE 2,134,008

FASTENING MECHANISM

Henry J. Sharp, Pittsburgh, Pa., assignor of fifty-one one-hundredths to William W. Martin, Pittsburgh, Pa.

Application December 16, 1936, Serial No. 116,167

9 Claims. (Cl. 189—36)

This invention consists of an improvement in fastening means for connecting adjacent members of any available construction by wedging and locking mechanism of simple, cheap and efficient construction. In the accompanying drawings I have illustrated its application to the skeleton framework of a building or the like utilizing structural form members.

However the joint may be utilized wherever members of any other construction are such as to functionally cooperate therewith, as hereinafter described.

Generally stated, the invention comprises a tensioning tongue and wedging means connecting it with terminal portions of elements to be fastened tightly together, preferably with an intervening guiding or centralizing member as a slotted plate, and means for tightly holding the wedging means in position.

In the drawings showing one application of the invention:

Fig. 1 is a perspective view showing the device as applied to the members of building construction framework;

Fig. 2 is a partial sectional view in elevation;

Fig. 3 is a cross section on the line III—III of Fig. 2;

Fig. 4 is a vertical section on the line IV—IV of Fig. 2;

Fig. 5 is an enlarged similar detail sectional view illustrating the tightening wedges in partially and finally inserted positions;

Fig. 6 is an isometric view illustrating the tensioning tongue in operative relation to an anchoring plate of one of the main members;

Fig. 7 is a detail view of one of the tightening wedges;

Fig. 8 is a similar view of the locking wedge therefor;

Fig. 9 is a diagrammatic view illustrating the shearing of said members from a strip blank;

Fig. 10 is a view like Fig. 7 showing a modified form of tightening wedge.

In the drawings A represents the upper portion of a wall forming frame terminating at a common level, on which is superimposed the next adjacent base portion B of a similar framing.

Each such unit is provided at intervals with post or column members of structural steel, as opposite pairs of angle bars having outer flanges 2 and inner flanges 3, the latter connecting at their upper ends of unit A with an intervening vertical cross plate 4 by riveting or spot welding.

Base portion or unit B of the superimposed framing is of similar construction, the lower ends of angle members 2a—3a connecting with a similar cross plate 4a, both such plates being in edgewise register when erected.

Resting on and similarly secured to the post members are angle member sills 5, the upper flanges 6 of which are on a common level coextensive of their length. The upper corner portions of plate 4 are recessed as at 4b for clearance of the flanges 5—6 of the horizontal angle members. The opposite portions of said angle members at the top of the frame A are fixedly connected by a plate 7, riveted or welded to the flanges 6 of angle bars 5 and bear upon the middle top edge portion of plate 4, thus forming a rigid supporting base plate for the base of portion B.

It will thus be seen that such plate 7 forms a terminal element for relative adjustment and firm attachment and connection of both column members, while also defining their alinement location and correct placement in erection.

The present invention provides for tight and permanent adjustment of the terminal plates or webs 4 and 4a towards each other and against the plate 7. Such result is secured by means of a tensioning tongue or plate 8 which extends through a slotted opening 9 of plate 7 and having holding connection with each plate 4 and 4a by the wedging means shown. For such means, each plate 4 and 4a is provided with a slotted opening 10 and 10a respectively, registering with similar openings 11 and 11a of plate 8.

Means are provided for locating the parts to be connected thus in register as by pressed out lugs 12, whereby the tensioning tongue may be inserted downwardly to approximately the proper position, with the lugs abutting plate 7 as in Figs. 4 and 5.

Openings 10 and 11 and 10a and 11a being thus brought in register, a main wedge 13 is then inserted through each such pair of openings and driven in to position as in Fig. 4, and securely held against loosening or removal by locking wedge 14.

The main wedge 13 is provided with tapering edges 15, outer limiting lugs 16, intervening parallel edges 17 and a transverse slot 18 for the locking wedge 14.

I show in Fig. 9 a diagram illustrating the shearing and punching of such pieces from a continuous strip blank of metal, without waste of material and providing for simultaneous formation of a pair at each operation, as will be readily understood.

When wedge 13 is driven in tightly to its full extent as limited by lugs 16, with plate 4 abutting plate 7, tensioning tongue 8 is drawn tightly down to fixed position and connection with the plate as by the lower wedge of Fig. 5.

In such position slot 11a is in substantial register with slot 10a of plate 4a and the wedge 13 being then driven clear in will force plate 4a downwardly, absorbing any clearance as at 19, and thus permanently tightening base of unit B against the supporting top of framing A.

As shown, wedge 13 is provided with a transverse slot 18 for reception of locking wedge 14 thus effectively holding it with the parallel edges 17 in firm tight engagement with both slots.

In such position with the parallel edges of the wedge engaging the slot edges, and the tapering edges of the wedge extending beyond, there ceases to be any wedging reaction, thus eliminating any reverse forces tending to loosening. However the locking wedge 14 when driven in tightly as described will positively ensure permanent tight connection of the parts.

The small end of locking wedge 14, as sheared, is also provided with short parallel edges 20 coextensive with edges 17 of the main wedge. Such formation facilitates insertion in slot 18 with binding engagement by the tapered edges of the locking wedge against the face of the tensioning tongue and the outer end portion of the slot 18 respectively when driven.

If desired the tightening wedge may be of cylindrical form 13a as in Fig. 10 for insertion through openings 10—11 or 10a—11a, also of corresponding cylindrical form. In such case the corresponding parts are similarly identified by corresponding numerals having the exponent a, and the slot 18a will receive and function with the locking key 14 in the manner described.

It will be understood that the structural members of section A are rigidly connected together as by riveting or welding with each other and with the plate 4, and that plate 7 provides a level seat for the base of section B. Also that the structural members of section B are similarly connected with plate 4a, the lower edge whereof forms a flush footing support with the bases of the angle members, for firm placement on plate 7.

When connected in the manner shown and described at the several junctions of the column members, a continuous structure may be erected, utilizing two or more vertically arranged series of complete wall frame units, and maintained in continuous vertical alinement throughout by the fastening means employed.

It will be understood that the particular application of the tightening mechanism is not limited to any particular form or design of construction to be fastened together, and that it may be changed or varied by the skilled mechanic to adapt it to suitable use, or in detail construction or otherwise within the scope of the following claims.

I claim:

1. Means for connecting opposing flat faced members each having a slotted opening consisting of a tensioning tongue having slotted openings registering with said openings, a wedge extending through each pair of registering openings, and means arresting movement of the tensioning tongue.

2. Means for connecting opposing plate members arranged on a common plane and each having a slotted opening therethrough consisting of an overlapping tensioning tongue having slotted openings registering with said openings and an arresting abutment, means engaging said abutment, and a wedge extending through each pair of registering openings.

3. Means for connecting opposing plate members arranged on a common plane and each having a slotted opening therethrough consisting of an overlapping tensioning tongue having slotted openings registering with said openings and an arresting abutment, means engaging said abutment, a wedge extending through each pair of registering openings, and means for locking said wedges.

4. Means for connecting opposing plate members arranged on a common plane and each having a slotted opening therethrough, and an intervening slotted separating plate forming a bearing for the adjacent edges of said plate members, consisting of a tensioning tongue extending through the intervening plate having slotted openings registering with said openings and an abutment engaging the intervening plate, and a tightening wedge extending through each pair of registering openings.

5. Means for connecting opposing plate members arranged on a common plane and each having a slotted opening therethrough, and an intervening slotted separating plate forming an abutment for the adjacent edges of said plate members consisting of a tensioning tongue extending through the intervening plate and having a limiting lug engaging said plate and slotted openings registering with the openings in the plate members, and a tightening wedge extending through each pair of such registering openings.

6. In combination with a pair of edgewise confronting plate members on a common plane and an intervening slotted separating plate, one of said plate members having a slotted opening, a tensioning tongue connected with one of said edgewise confronting plate members extending through the separating plate in resisting engagement therewith and provided with an opening registering with the opening of the other plate member, and a tightening wedge extending through said registering openings.

7. Means for connecting the column members of a plurality of building construction units each composed of structural elements and provided with terminal cross plates consisting of a transverse plate connected with the end of one column member having a slotted opening therethrough, and an overlapping tensioning plate extending through the transverse plate having an abutment engaging said transverse plate and laid against the cross plates and secured to one member thereof, and wedging mechanism connecting it to the other cross plate for tightening it against the transverse plate.

8. In combination with a transverse bearing plate having a clearance opening and opposing web-like terminal members arranged edgewise on a common plane for tightening adjustment towards the bearing plate, a tensioning tongue insertible through the opening of the bearing plate having an abutment engageable with the bearing plate, and adjusting means connecting the tensioning tongue with said terminal members.

9. Means for connecting the column members of a plurality of building construction units each composed of structural elements provided with a terminal cross plate consisting of an intervening bearing plate, an overlapping tensioning plate laid against the cross plates, movement limiting means on the tensioning plate engaging the bearing plate, and wedging mechanism for tightening one cross plate towards the other.

HENRY J. SHARP.